M. A. K. SHOTWELL.
AUTOMOBILE TIRE.
APPLICATION FILED AUG. 5, 1918.

1,313,506.

Patented Aug. 19, 1919.

Inventor

UNITED STATES PATENT OFFICE.

MARCUS AREATAS KOSSUTH SHOTWELL, OF MIAMI, FLORIDA.

AUTOMOBILE-TIRE.

1,313,506.  Specification of Letters Patent.  Patented Aug. 19, 1919.

Application filed August 5, 1918. Serial No. 248,482.

*To all whom it may concern:*

Be it known that I, MARCUS AREATAS KOSSUTH SHOTWELL, a citizen of the United States, residing at Miami, in the county of Dade and State of Florida, have invented a new and useful Automobile-Tire, of which the following is a specification.

My invention relates to improved automobile tires, wherein no rubber, pneumatic tubes, or air cushions form a part of their construction, the object being to provide tires at less cost and of more enduring character, thus obviating the expense and annoyance of punctures and blowouts.

I attain these objects by the mechanism illustrated in the accompanying drawings, in which:—

Figure 1:
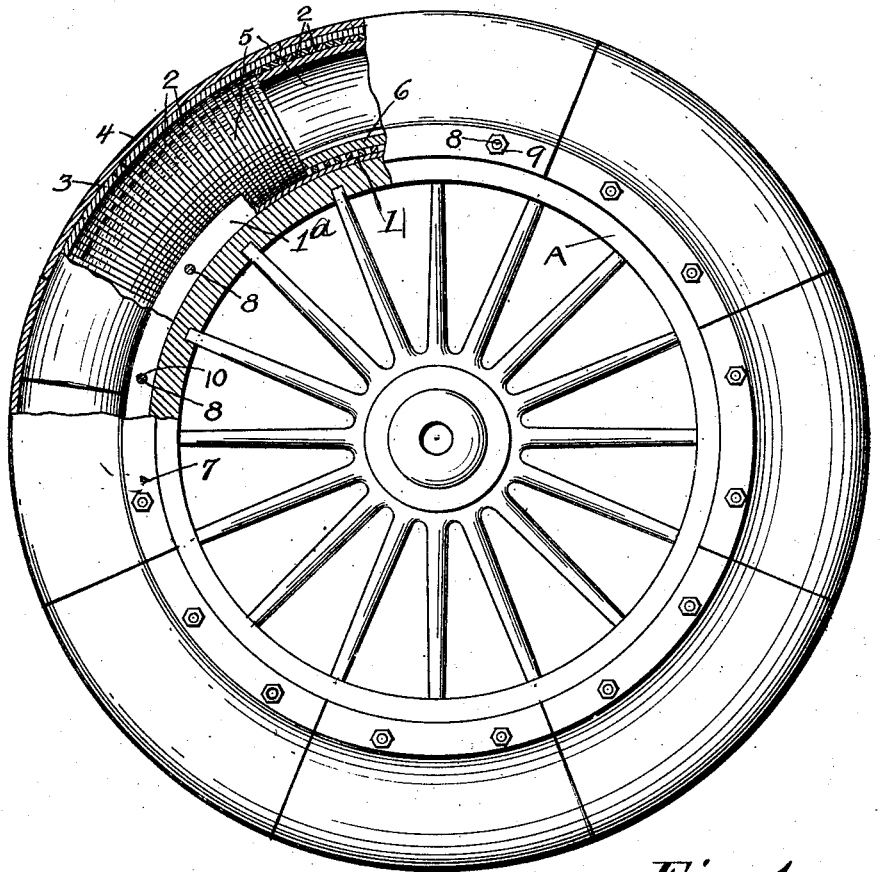

Figure 1, is a side elevation, illustrative of my tire, in its respective position, attached to the wheel, a section of its interior exposed to view.

Figure 2:
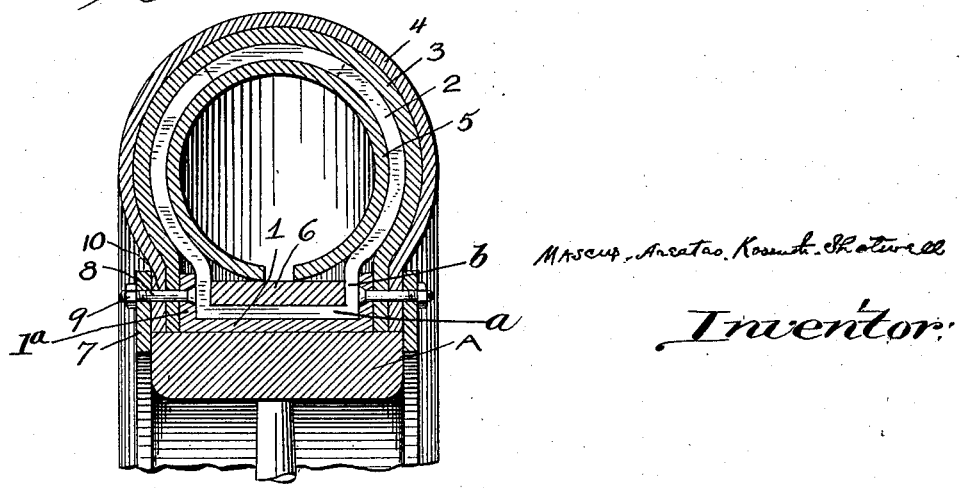

Fig. 2, a cross sectional view, illustrative of its formation.

Similar numerals refer to similar parts throughout the several views.

As disclosed in the accompanying drawings, A denotes the felly of a wheel body which has disposed circumferentially there-around a base ring 1 and of a width less than the width of the felly A, said ring being positioned substantially centrally of the felly.

The ring 1 is substantially U-shaped in cross section and extending within and supported by the ring 1 is a plurality of transversely arranged springs 2. Each of the springs 2 is formed from a single strip of material, preferably steel, which is bent to form a straight portion *a*, outwardly extending side portions *b* at right angles to the base portion, and then continued to form substantially a circle, the extremities of the strip lapping each other at the tread portion of the tire. The base portion *a* and the side portions *b* of each of the springs 2 snugly fit within the ring 1 or more particularly the channel as afforded by the side flanges 1ª of the ring 1.

Inclosing the springs 2 is a sectional flexible casing 3 and disposed over the casing 3 is an auxiliary sectional casing 4. The marginal portions of the casings 3 and 4, when applied, overlie the outer faces of the flanges 1ª and coacting with said overlying portions are the clamping rings 7. Disposed through registering perforations 10 in the side flanges 1ª, the marginal portions of the casings 3 and 4, and the rings 7, are a plurality of circumferentially spaced bolts 8 and with which coact the nuts 9, whereby the several parts are effectively maintained in proper assemblage.

Disposed throughout the substantially circular portion of the springs 2 is a metallic tubular core 5 which contacts with such portions of the springs 2 and the inner periphery of the core 5 is split circumferentially forming slightly spaced edges which bear upon a strip of cushioning material 6. The strip 6 is also disposed circumferentially of the felly A and is positioned between the side portions *b* of the springs and rests upon the base portions *a* thereof. The core 5 acts in conjunction with the springs 2 to support the load imposed upon the wheel body.

From the foregoing description, it is thought to be obvious that an automobile tire constructed in accordance with my invention is particularly well adapted for use by reason of the convenience and facility with which it may be assembled and operated and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

1. A tire of the class described comprising a member adapted to be disposed circumferentially around a wheel body, said member being substantially U-shaped in cross section, a plurality of transversely disposed springs, each of said springs having a base portion contacting with the member and having outwardly extending side portions in contact with the sides of the member and continued to form substantially a circle, the extremities of the spring lapping each other at the tread portion of the tire, and a casing disposed over the springs and secured to the sides of the member.

2. A tire of the class described comprising a member adapted to be disposed circumferentially around a wheel body, said member being substantially U-shaped in cross section, a plurality of transversely disposed springs, each of said springs having a base portion contacting with the member and having outwardly extending side portions in contact with the sides of the member and continued to form substantially a circle, the extremities of the spring lapping each other at the tread portion of the tire, a casing disposed over the springs and secured to the sides of the member, and a tubular core disposed through the substantially circular portions of the springs, said core being circumferentially split.

3. A tire of the class described comprising a member adapted to be disposed circumferentially around a wheel body, said member being substantially U-shaped in cross section, a plurality of transversely disposed springs, each of said springs having a base portion contacting with the member and having outwardly extending side portions in contact with the sides of the member and continued to form substantially a circle, the extremities of the spring lapping each other at the tread portion of the tire, a casing disposed over the springs and secured to the sides of the member, a tubular core disposed through the substantially circular portions of the springs, said core being circumferentially split, and a cushioning strip disposed circumferentially around the member and resting upon the base portions of the springs, the tubular core contacting with the cushioning strip.

4. A tire of the class described comprising an annular member adapted to be disposed circumferentially around a wheel body, a casing secured to the member, and a plurality of springs substantially radiating from the member and contacting with the inner wall of the casing, each of said springs at the tread portion of the casing having end portions in lapping relation.

5. A tire of the class described comprising a member adapted to be disposed circumferentially around a wheel body, said member being substantially U-shaped in cross section, a plurality of transversely disposed springs, each of said springs having a base portion contacting with the member and having outwardly extending side portions in contact with the sides of the member and continued to form substantially a circle, the extremities of the spring lapping each other at the tread portion of the tire, a casing disposed over the springs and secured to the sides of the member, and an additional cushioning agency disposed through the springs and coacting therewith.

MARCUS AREATAS KOSSUTH SHOTWELL.

Copies of this patent may be obtained for five cents each, by addressing the "Commissioner of Patents, Washington, D. C."